(12) United States Patent
Lin

(10) Patent No.: US 9,307,160 B2
(45) Date of Patent: Apr. 5, 2016

(54) METHODS AND SYSTEMS FOR GENERATING HDR IMAGES

(71) Applicant: HTC Corporation, Taoyuan County (TW)

(72) Inventor: Chun-Ta Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 141 days.

(21) Appl. No.: 13/965,205

(22) Filed: Aug. 13, 2013

(65) Prior Publication Data

US 2015/0049213 A1    Feb. 19, 2015

(51) Int. Cl.
| | |
|---|---|
| *G06K 9/40* | (2006.01) |
| *H04N 5/235* | (2006.01) |
| *G06T 5/50* | (2006.01) |
| *G06T 5/00* | (2006.01) |

(52) U.S. Cl.
CPC .............. *H04N 5/2355* (2013.01); *G06T 5/009* (2013.01); *G06T 5/50* (2013.01); *G06T 2207/10016* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 7,209,601 | B2 * | 4/2007 | Manabe | 382/294 |
| 2005/0018927 | A1 * | 1/2005 | Manabe | 382/294 |
| 2010/0328780 | A1 * | 12/2010 | Tocci | 359/636 |
| 2013/0083226 | A1 * | 4/2013 | Kwan et al. | 348/302 |
| 2013/0208138 | A1 * | 8/2013 | Li et al. | 348/229.1 |
| 2014/0267828 | A1 * | 9/2014 | Kasai et al. | 348/229.1 |
| 2014/0347521 | A1 * | 11/2014 | Hasinoff et al. | 348/239 |

* cited by examiner

*Primary Examiner* — Li Liu
(74) *Attorney, Agent, or Firm* — CKC & Partners Co., Ltd.

(57) ABSTRACT

Methods and systems for generating HDR (High Dynamic Range) images are provided. First, frames are continuously captured, wherein the respective frames are captured with a same exposure time. At least one intermediary frame is then generated according to at least one of the frames. The at least one intermediary frame is composed using a HDR composition algorithm to generate a HDR image.

8 Claims, 5 Drawing Sheets

METHODS AND SYSTEMS FOR GENERATING HDR IMAGES

BACKGROUND OF THE INVENTION

1. Field of the Invention

The disclosure relates generally to methods and systems for generating HDR (High Dynamic Range) images, and more particularly to methods and systems for generating HDR images based on frames with the same exposure time.

2. Description of the Related Art

Recently, portable devices, such as handheld devices, have become more and more technically advanced and multifunctional. For example, a handheld device may have telecommunications capabilities, e-mail message capabilities, image capture capabilities, an advanced address book management system, a media playback system, and various other functions. Due to increased, convenience and functions of the devices, these devices have become necessities of life.

Currently, a function called "HDR" or 'HDRI (High Dynamic Range imaging)' is provided on the portable devices, such as cameras. HDR is a method used in imaging and photography to allow a greater dynamic range between the lightest and darkest areas of an image than that of the traditional methods. HDR images can show more accurate range of intensity levels in real scenes.

Generally, non-HDR cameras take image frames at one exposure level, thus to obtain a limited contrast range. This results in the loss of detail in bright or dark areas of an image. In HDR methods, this loss of detail is compensated by taking multiple image frames at different exposure levels, and composing them together to generate an image that is representative in both dark and bright areas.

As described, in the HDR methods, a camera needs to take multiple image frames at different exposure levels. That is, the camera must support multi-frames, and have different camera exposure levels for capturing images. HDR is functionless for those cameras without the support of multi-frames, and having only one camera exposure level.

BRIEF SUMMARY OF THE INVENTION

Methods and systems for generating HDR images are provided.

In an embodiment of a method for generating HDR images, a plurality of frames are captured, wherein the respective frames are captured with a same exposure time. At least one intermediary frame is then generated according to at least one of the frames. The at least one intermediary frame is composed using a HDR composition algorithm to generate a HDR image.

An embodiment of a system for generating HDR images comprises an image capture unit and a processing unit. The image capture unit captures a plurality of frames, wherein the respective frames are captured with a same exposure time. The processing unit generates at least one intermediary frame according to at least one of the frames.

In some embodiments, the at least one intermediary frame is generated by combining at least one of the frames.

In some embodiments, the frames comprise a first frame and a second frame in sequence, and the at least one intermediary frame comprises a first intermediary frame as the second frame, and a second intermediary frame generated by combining the second frame and the first frame.

In some embodiments the frames comprise a first frame, a second frame, and a third frame in sequence, and the at least one intermediary frame comprises a first intermediary frame as the third frame, and a second intermediary frame generated by combining the third frame and the second frame, and a third intermediary frame generated by combining the third frame, the second frame, and the first frame.

In an embodiment of a method for generating HDR images, a plurality of frames are captured, wherein the respective frames are captured with a same exposure time. Then, a plurality of intermediary frames are generated according to the frames, wherein each intermediary frame is generated by combining at least one of the frames and the intermediary frames are composed using a HDR composition algorithm to generate a HDR image.

An embodiment of a system for generating HDR images comprises an image capture unit and as processing unit. The image capture unit captures as plurality of frames, wherein the respective frames are captured with a same exposure time. The processing unit generates a plurality of intermediary frames according to the frames, wherein each intermediary frame is generated by combining at least one of the frames and the intermediary frames are composed using a HDR composition algorithm to generate a HDR image.

In some embodiments, the more number of the frames used for generating the intermediary frame is, the brighter the intermediary frame is.

Methods for generating HDR images may take the term of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Methods and systems for generating HDR images are provided.

Figure 1:
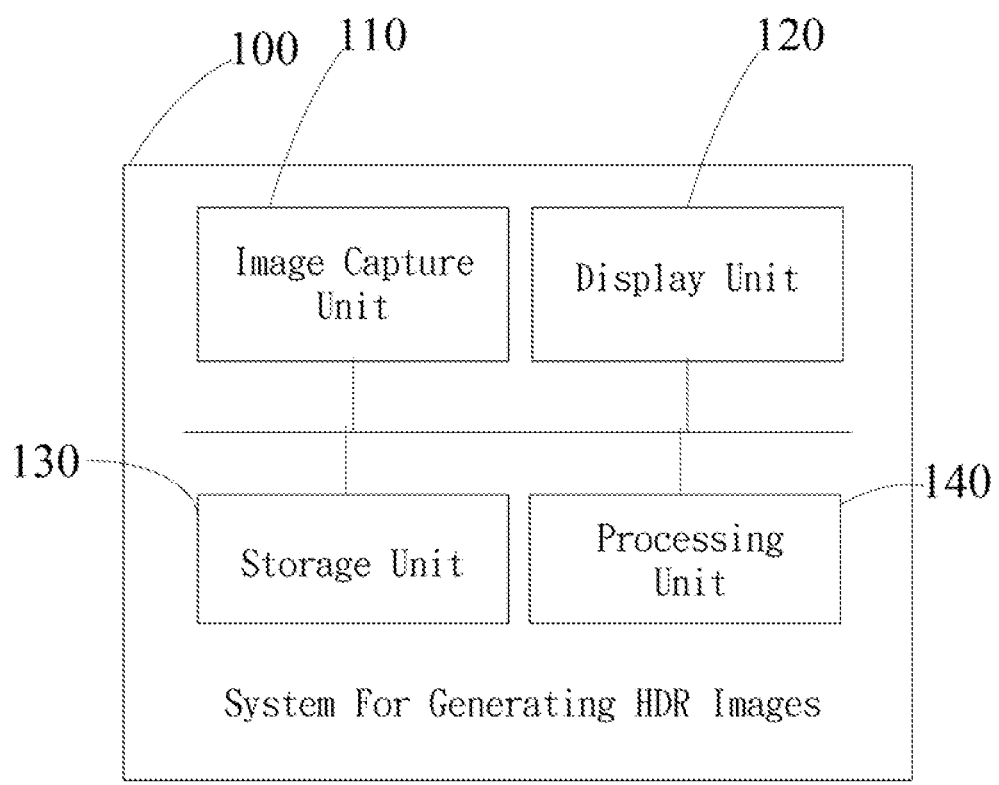
FIG. 1 is a schematic diagram illustrating, an embodiment of a system for generating HDR images of the invention.

FIG. 1 is a schematic diagram illustrating an embodiment of a system for generating HDR images of the invention. The system for generating HDR images 100 can be used in an electronic device, such as a computer, or a portable device, such as a digital camera, a handheld device such as a mobile phone, a smart phone, a PDA (Personal Digital Assistant), a GPS (Global Positioning System), or any picture-taking device.

Figure 2:
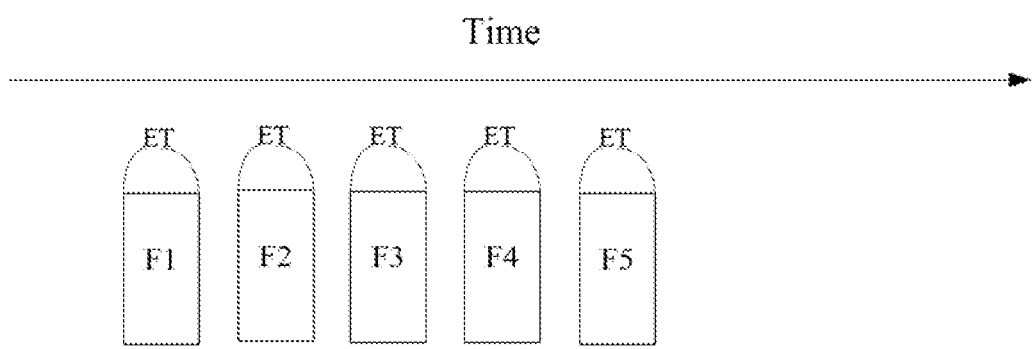
FIG. 2 is a schematic diagram illustrating the continuously captured frames with a same exposure time.

The system for generating HDR images 100 comprises an image capture unit 110, a display unit 120, a storage unit 130, and a processing unit 140. The image capture unit 110 may be a CCD (Charge Coupled Device) or a CMOS (Complementary Metal-Oxide Semiconductor), placed at the imaging position for objects inside the electronic device. The image capture unit 110 can continuously capture frames with a same exposure time. FIG. 2 is a schematic diagram illustrating the continuously captured frames with a same exposure time. As shown in FIG. 2, as time goes, frames (F1, F2, F3, F4, F5, . . . ) with the same exposure time ET are captured one by one. The continuously captured frames with the same exposure time can be used for generating HDR images, which will be discussed later. The display unit 120 can display related figures and interfaces, and related data, such as the image frames continuously captured by the image capture unit 110. It is understood that, in some embodiments, the display unit 120 may be a screen integrated with a touch-sensitive device (not shown). The touch-sensitive device has a touch-sensitive surface comprising sensors in at least one dimension to detect contact and movement of an input tool, such as a stylus or finger on the touch-sensitive surface. That is, users can directly input related data via the display unit 120. It is understood that, the image data captured by the image capture unit 110 can be permanently or temporarily stored in the storage unit 130, which may be a built-in memory, or an external memory card of the system for generating HDR images 100. The processing unit 140 can control related components of the system for generating HDR images 100, process the image frames continuously captured by the image capture unit 110, and perform the methods for generating HDR images of the invention, which will be discussed further in the following paragraphs. It is noted that, the system for generating HDR images 100 can further comprise a focus unit (not shown in FIG. 1). The processing unit 140 can control the focus unit to perform a focus process for at least one object during the image capture process.

Figure 3:
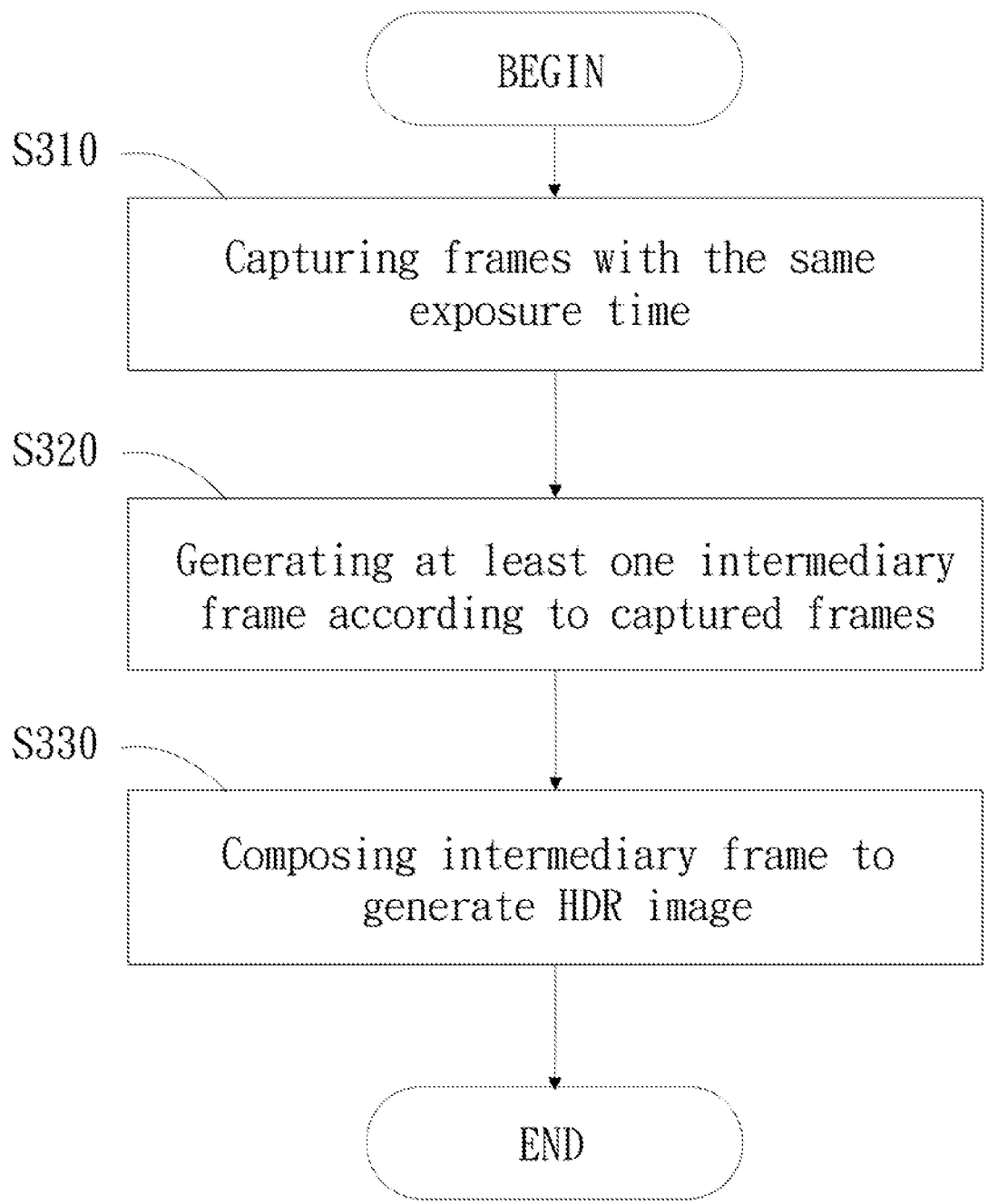
FIG. 3 is a flowchart of an embodiment of a method for generating HDR images of the invention.

FIG. 3 is a flowchart of an embodiment of a method for generating HDR images of the invention. The method for generating HDR images can be used in an electronic device, such as a computer, or a portable device, such as a digital camera, a handheld device such as a mobile phone, a smart phone, a PDA, a GPS, or any picture-taking device.

In step S310, frames are continuously captured, wherein the respective frames are captured with a same exposure time. It is noted that, in the embodiment, the electronic device can only have one exposure level, and all captured frames will have the same exposure time. In step S320, at least one intermediary frame is generated according to at least one of the frames. It is understood that, in some embodiments, each intermediary frame can be generated by combining an arbitrary number of the frames. For example, when a first frame and a second frame with the same exposure time are continuously captured in sequence, a first intermediary frame can be set as the second frame, and a second intermediary frame can be generated by combining the second frame and the first frame. In another example, when a first frame, a second frame, and a third frame with the same exposure time are continuously captured in sequence, a first intermediary frame can be set as the third frame, a second intermediary frame can be generated by combining the third frame and the second frame, and a third intermediary frame can be generated by combining the third frame, the second frame, and the first frame. It is noted that, the more number of the frames used for generating the intermediary frame is, the brighter the intermediary frame is. It is understood that, the above composition manners are only examples of the present invention, and the present invention is not limited thereto. After the intermediary frame is generated, in step S330, the at least one intermediary frame is composed using a HDR composition algorithm to generate a HDR image. It is understood that, the HDR composition algorithm may be various and known in the art, and related descriptions are omitted here.

Figure 4:
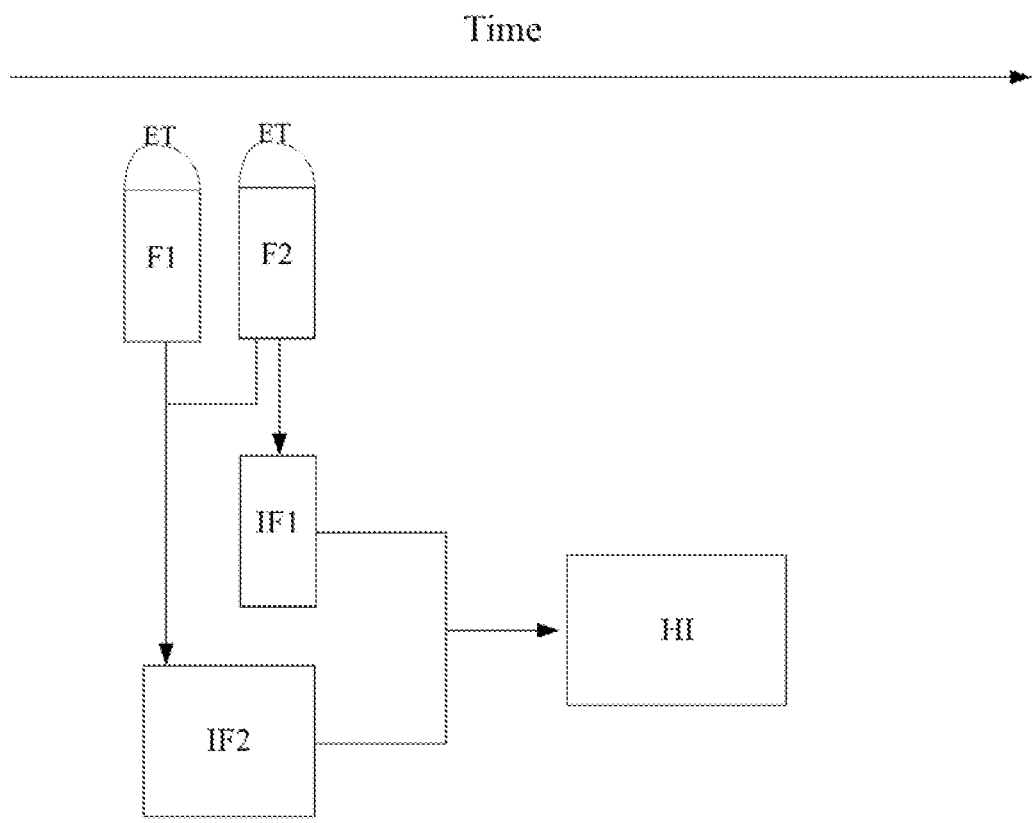
FIG. 4 is a schematic diagram illustrating an example of HDR image generation according to a method for generating HDR images of the invention.

FIG. 4 is a schematic diagram illustrating an example of HDR image generation according to a method for generating HDR images of the invention. As shown in FIG. 4, frames F1 and F2 with the same exposure time ET are continuously captured in sequence. Frame F2 can be directly set as a first intermediary frame IF1, and frames F2 and F1 are combined to generate a second intermediary frame IF2. The first intermediary frame IF1 and the second intermediary frame IF2 are composed using a HDR composition algorithm to generate a HDR image HI.

Figure 5:
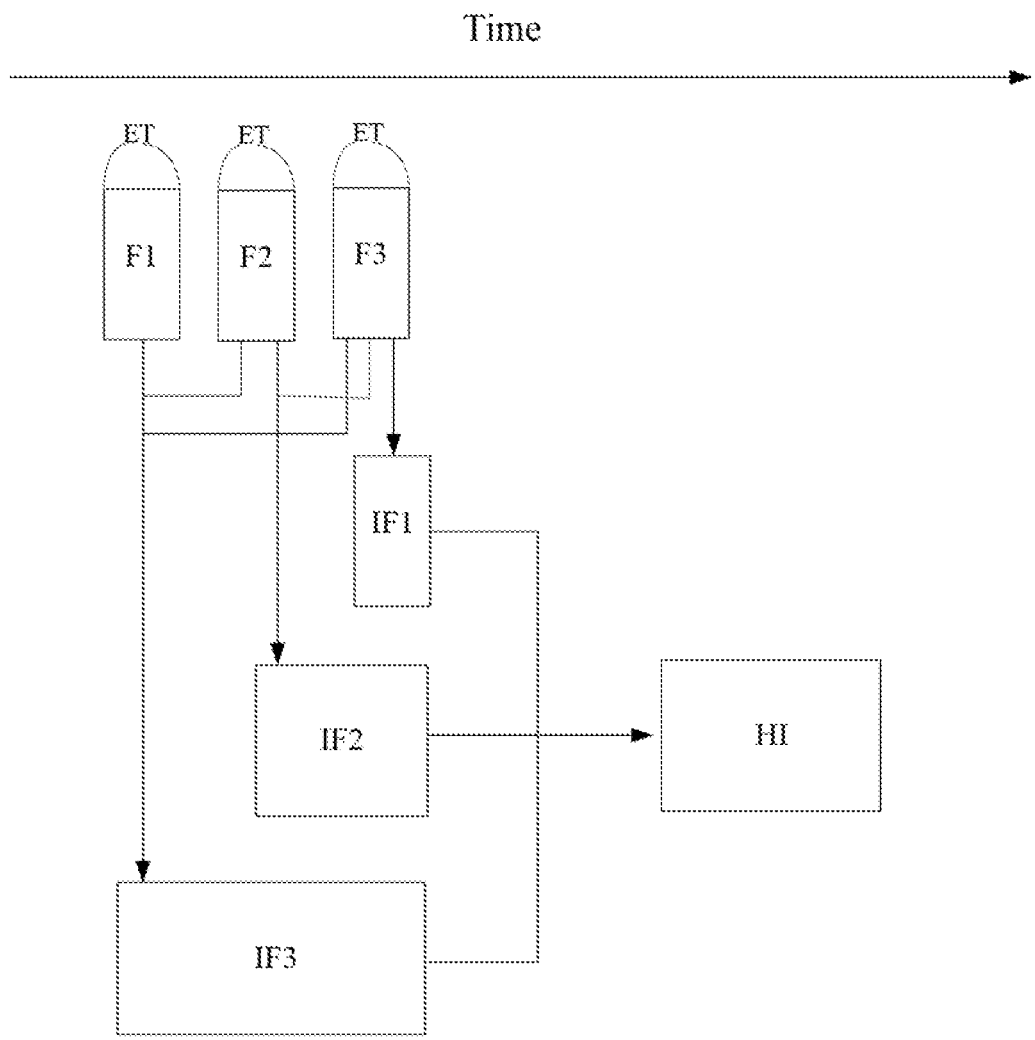
FIG. 5 is a schematic diagram illustrating another example of HDR image generation according to a method for generating HDR images of the invention.

FIG. 5 is a schematic diagram illustrating another example of HDR image generation according to a method for generating, HDR images of the invention. As shown in FIG. 5, frames F1, F2 and F3 with the same exposure time ET are continuously captured in sequence. Frame F3 can be directly set as a first intermediary frame IF1, frames F3 and F2 are combined to generate a second intermediary frame IF2, and frames F3, F2 and F1 are combined to generate a third intermediary frame IF3. The first intermediary frame IF1, the second intermediary frame IF2 and the third Intermediary frame IF3 are composed using a HDR composition algorithm to generate a HDR image HI. It is understood that, the generation of the intermediary frame based on the frames with the same exposure time of the present invention will be more efficient than that of the HDR cameras in adjusting different exposure levels.

Therefore, the methods and systems for generating HDR images of the present invention can generate HDR images based on frames with the same exposure time, thus providing a HDR function to non-HDR cameras, and improving the efficiency for generation of HDR images.

Methods for generating HDR images, may take the form of a program code (i.e., executable instructions) embodied in tangible media, such as floppy diskettes, CD-ROMS, hard drives, or any other machine-readable storage medium, wherein, when the program code is loaded, into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for generating HDR (High Dynamic Range) images for use in an electronic device, comprising:
   capturing a plurality of frames, wherein the respective frames are captured with a same exposure time;
   composing a first intermediary frame and a second intermediary frame from the plurality of frames;
   generating, using a HDR composition algorithm, a HDR image from the first intermediary frame and the second intermediary frame;

wherein the frames comprises a first frame and a second frame in sequence, the first intermediary frame is the same as the second frame, and the second intermediary frame is generated by combining the second frame and the first frame.

2. A method for generating HDR (High Dynamic Range) images for use in an electronic device, comprising:
   capturing a plurality of frames, wherein the respective frames are captured with a same exposure time;
   composing a first intermediary frame, a second intermediary frame and a third intermediary frame from the plurality of frames;
   generating, using a HDR composition algorithm, a HDR image from the first intermediary frame, the second intermediary frame and the third intermediary frame;
   wherein the frames comprises a first frame, a second frame, and a third frame in sequence, the first intermediary frame is the same as the third frame, the second intermediary frame is generated by combining the second frame and the third frame, and the third intermediary frame is generated by combining the first frame and the second frame and the third frame.

3. The method of claim 2, wherein the more number of the frames used for generating the intermediary frame is, the brighter the intermediary frame is.

4. A system for generating HDR (High Dynamic Range) images for use in an electronic device, comprising:
   an image capture unit a plurality of frames, wherein the respective frames are captured with a same exposure time; and
   a processing unit composing a first intermediary frame and a second intermediary frame from the plurality of frames; and
   the processing unit generating, using a HDR composition algorithm, a HDR image from the first intermediary frame and the second intermediary frame;
   wherein the frames comprises a first frame and a second frame in sequence, the first intermediary frame is the same as the second frame, and the second intermediary frame is generated by combing the second frame and the first frame.

5. A system for generating HDR (High Dynamic Range) images for use in an electronic device, comprising:
   an image capture unit capturing a plurality of frames, wherein the respective frames are captured with a same exposure time; and
   a processing unit composing a first intermediary frame, a second intermediary frame and a third intermediary frame from the plurality of frames;
   the processing unit generating, using a HDR composition algorithm, a HDR image from the first intermediary frame, the second intermediary frame and the third intermediary frame;
   wherein the frames comprises a first frame, a second frame, and a third frame in sequence, the first intermediary frame is the same as the third frame, the second intermediary frame is generated by combining the second frame and the third frame, and the third intermediary frame is generated by combining the first frame and the second frame and the third frame.

6. The system of claim 5, wherein the more number of the frames used for generating the intermediary frame is, the brighter the intermediary frame is.

7. A machine-readable storage medium storing a computer program, which, when executed, causes a device to perform a method for generating HDR (High Dynamic Range) images, wherein the method comprises:
   capturing a plurality of frames, wherein the respective frames are captured with a same exposure time;
   composing a first intermediary frame and a second intermediary frame from the plurality of frames;
   generating, using a HDR composition algorithm, a HDR image from the first intermediary frame and the second intermediary frame;
   wherein the frames comprises a first frame and a second frame in sequence, the first intermediary frame is the same as the second frame, and the second intermediary frame is generated by combining the second frame and the first frame.

8. A machine-readable storage medium storing a computer program, which, when executed, causes a device to perform a method for generating HDR (High Dynamic Range) images, wherein the method comprises:
   capturing a plurality of frames, wherein the respective frames are captured with a same exposure time;
   composing a first intermediary frame, a second intermediary frame and a third intermediary frame from the plurality of frames;
   generating, using a HDR composition algorithm, a HDR image from the first intermediary frame, the second intermediary frame and the third intermediary frame;
   wherein the frames comprises a first frame, a second frame, and a third frame in sequence, the first intermediary frame is the same as the third frame, the second intermediary frame is generated by combining the second frame and the third frame, and the third intermediary frame is generated by combining the first frame and the second frame and the third frame.

* * * * *